(12) United States Patent
O'Gorman et al.

(10) Patent No.: US 11,453,338 B2
(45) Date of Patent: Sep. 27, 2022

(54) SELFIE BUTTON FOR VEHICLE CAMERAS WITH FLASH

(71) Applicant: Ford Global Technologies, LLC, Dearborn, MI (US)

(72) Inventors: Ryan O'Gorman, Beverly Hills, MI (US); Ankur Sharma, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/174,241

(22) Filed: Feb. 11, 2021

(65) Prior Publication Data

US 2022/0250544 A1  Aug. 11, 2022

(51) Int. Cl.
*B60R 1/00*  (2022.01)
*H04N 5/232*  (2006.01)

(52) U.S. Cl.
CPC ......... *B60R 1/002* (2013.01); *H04N 5/23206* (2013.01); *B60R 2300/80* (2013.01)

(58) Field of Classification Search
CPC ............... B60R 1/002; B60R 2300/80; B60R 2001/1253; B60R 21/01538; B60R 2300/10; B60R 2300/101; B60R 2300/102; B60R 2300/103; B60R 2300/105; B60R 2300/107; B60R 25/31; B60R 25/305; H04N 5/23206
USPC ........................................................ 348/148
See application file for complete search history.

(56) References Cited

U.S. PATENT DOCUMENTS

| 4,789,904 | A | 12/1988 | Peterson |
| 8,164,670 | B2 | 4/2012 | Robinson et al. |
| 8,446,469 | B2 | 5/2013 | Blanco et al. |
| 10,179,568 | B2 * | 1/2019 | Hariri .................. B60R 25/245 |
| 11,024,139 | B1 * | 6/2021 | Van Wiemeersch ... G08B 13/08 |
| 2006/0139155 | A1 * | 6/2006 | Kim ...................... B60R 25/305 340/426.18 |
| 2009/0058685 | A1 * | 3/2009 | Mc Call ............... G08G 1/0969 340/995.24 |
| 2015/0086175 | A1 | 3/2015 | Lorenzetti |
| 2015/0195518 | A1 * | 7/2015 | Shikii ................ H04N 21/2187 348/148 |

(Continued)

OTHER PUBLICATIONS

"Honda Introduces All-New 2016 HR-V SLF 'Selfie' Edition Mar. 31, 2015 https://hondanews.com/en-US/releases/honda-introduces-all-new-2016-hr-v-slf-selfie-edition?la=1&downloadUrl=%2Fen-US%2Freleases%2Frelease-dc38bf8e21f341fb9b5e9f1aa7fabd08%2Fdownload, describes a vehicle equipped with selfie cameras. 2 Pages.*

(Continued)

*Primary Examiner* — Nathnael Aynalem
(74) *Attorney, Agent, or Firm* — Brandon Hicks; Eversheds Sutherland (US) LLP (57) ABSTRACT

Systems and methods for logging images using integrated cameras, lights, and sensors of a vehicle are provided. The system may include a handheld actuator, e.g., a key fob, having a button for initiating the taking of a photo or the start or stop of the recording of a video by the integrated cameras of the vehicle. Moreover, the actuator may select lighting settings such that the integrated lights of the vehicle may illuminate the vicinity of the vehicle to create a flash effect for a photo, or illuminate the vicinity of the vehicle for a video. The image data captured by the cameras may be at least temporarily stored, and transmitted to, e.g., a mobile device within a predetermined range of the vehicle.

19 Claims, 3 Drawing Sheets

(56) References Cited

U.S. PATENT DOCUMENTS

| | | | |
|---|---|---|---|
| 2015/0258991 A1* | 9/2015 | Fletcher | B60Q 9/008 |
| | | | 340/435 |
| 2016/0006922 A1 | 1/2016 | Boudreau et al. | |
| 2017/0316254 A1* | 11/2017 | Hariri | G07C 9/253 |
| 2018/0129467 A1* | 5/2018 | Gage | B60N 2/002 |
| 2018/0215344 A1* | 8/2018 | Santora | B60R 25/32 |

OTHER PUBLICATIONS

"SLF 'Selfie' Edition for 2016 Honda HR-V" Youtube Mar. 31, 2015 https://www.youtube.com/watch?v=t19m5S-pJFg , 1 Page.*
J. Guerrero-Ibáñz "Sensor Technologies for Intelligent Transportation Systems" (Apr. 2018) pp. 1-24.

* cited by examiner

SELFIE BUTTON FOR VEHICLE CAMERAS WITH FLASH

BACKGROUND

People love to log journeys such as road trips. These logs might include photos and artifacts from the trip such as ticket stubs, post cards, etc. Anyone driving down the road knows that taking pictures through a car window or through an open window results in blurry or distorted pictures. People also may not be aware of the best time or location to take a picture to capture a location, landmark, or interesting roadside attraction. Likewise, the selfie has become a staple of evidence of being somewhere. Many selfies are restricted by the length of your arm but other novelty devices have been developed to allow more background in the pictures including selfie sticks, smart phone stands, pocket size selfie drones, etc.

Most modern cars have cameras built in, e.g., both on the front and the rear of the vehicle. In addition, many vehicles are integrating cameras for full 360 viewing as well as cameras directed into the cabin of the vehicle. Currently, these cameras are used for vehicle operations such as backing up, parking, security, and/or monitoring drivers for distracted or sleepy behaviors, but they do not provide access to the vehicle occupants for their own use cases. Moreover, some applications have explored using vehicle cameras in aggregate to find a target vehicle through video recognition software. It is with respect to these and other considerations that the disclosure made herein is presented.

DETAILED DESCRIPTION

Overview

Disclosed are systems and methods for using vehicles to capture images or videos during a road trip. The system may involve adding a photo button to the traditional key fob that allows the key fob to transmit a signal to the vehicle radio receiver and send that signal to the vehicle processor and camera modules to request a photo be captured. Likewise, a video button may be used to send a signal to begin a video capture and pressed a second time to stop the video capture. In both cases a response signal may be sent so the horn of the vehicle could honk, and/or lights of the vehicle could flash to indicate the picture or video had been taken, or in the case of a video, the video captured had ended.

The beginning and ending signals may be different. For example, a single flash may indicate the video capture had begun and a double flash may indicate the video capture had stopped and/or the photo had been captured. Sensors of the car also which allow the vehicle to identify if lighting is low and that headlights would need to be used while driving, may be accessed and timed with the video capture for lighting the surrounding of the video, and in the case of a photo, the bright setting on the headlights may pulse on to provide a flash-like quality to fill the image with lighting. To manually indicate whether lighting is required or not, the key fob photo and video button may be, e.g., pushed twice, sending a different signal indicating to the vehicle processor to time the lighting with the photo or video capture. When a person within proximity of a vehicle uses a photo key fob, the vehicle may also identify devices paired with the vehicle. With an application on the phone to leverage this paring, the vehicle may automatically send the picture and/or video directly to the connected and paired device, for example, after compressing the photo size. Alternatively, a full-size file may be transmitted. If the paired connected device should pass out of range prior to completing the transfer, the transfer could be completed after the device is back in range. Thus, the device may store the amount of data that was successfully transferred through confirmation signals passed wirelessly. In the photo/video settings on the vehicle and/or in the application (which may update between the two when settings are changed) the preferred delivery method may be set by the user. If the direct local delivery method wasn't desired, a text from the vehicle may be sent including the photo from the car with a time stamp associated with the picture. Likewise the photo, may be stored in the cloud on a server for later viewing or download.

The photo capture request may be generated on a mobile phone application with a digital representation of a button and settings for flash and backlighting preferences. This signal may be sent directly between the car and the phone, e.g., via Bluetooth, Wi-Fi, or a radio signal. Sending signals through the cloud via a cellular connection is common for most vehicle-to-smart device interactions, but may not allow real time photo functionality as desired with typical selfie photography. The delivery of the picture may be the same as the key fob photo button.

Moreover, an automatic feature may be used to capture pictures or video as well. For example, vehicle sensors (such as radar, LiDar, sonar, optical, etc.) typically on the vehicle for proximity detection when parking or for automatic cruise control or automatic braking may be used. Radar sensors use relatively low energy compared with cameras and video motion change to identify a person or object entering the view of the camera. Radar sensors are typically positioned in an array on a vehicle and may detect how the relative location of a person/object to the vehicle. Setting the radar sensor in automatic photo or video mode may serve as a motion detector that may actuate the camera to capture an image or photo. In this auto mode where the cameras would know where a person/object approaching the vehicle is located, typical proximity technology to recognize a key fob or smart device of the person, e.g., vehicle owner, may be used to confirm whether the approaching person picked up by the radar auto picture mode is the owner or not. For the purposes of selfies, taking a picture of everything that passes by would use significant data. Thus, correlating the location of a person and the identity of the person through the vehicle paired device would ensure that the vehicle is only taking pictures of the owner/operator as they approach or leave the vehicle. The automatic photos settings may be set to take photos, e.g., upon return or departure of the person from the vehicle.

In addition, radar sensors also may be used to detect the relative direction of motion of an object as it passes through the range of the sensors to allow the proper camera(s) to be triggered, as well as when video and/or photos are captured. This may be used to track a person or object as it moved around the vehicle.

An adaptation of the photo button may allow an owner to select which camera to use when capturing the picture or to use multiple cameras to create a series of pictures that may be used to, e.g., generate a panoramic view or capture a stop-motion action of someone or something moving around the car. This allows a user to choose the best picture or put a series of pictures together to more fully show surroundings.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1:
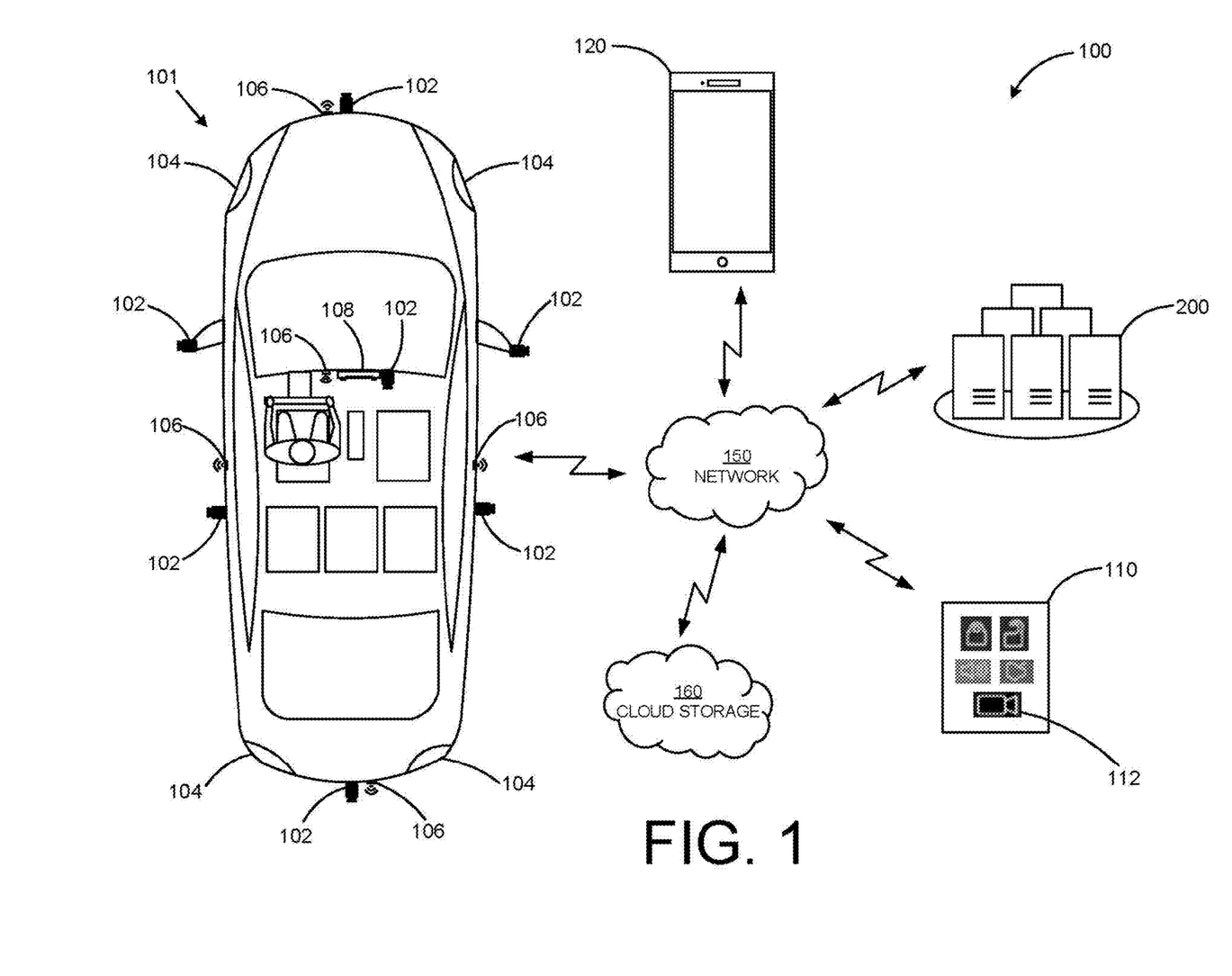
FIG. 1 illustrates a system for logging images using a vehicle in accordance with the principles of the present disclosure.

Referring now to FIG. 1, an exemplary system for logging images is provided. System 100 may include image logging platform 200 and vehicle 101 having one or more cameras 102, one or more lights 104, e.g., headlights and/or taillights of vehicle 101, one or more radar sensors 106, and control module 108, all integrated with vehicle 101. In addition, system 100 may include handheld actuator 110, e.g., a key fob, and/or an application installed on mobile device 120. Image logging platform 200 may be located on one or more servers, e.g., stored on cloud 160 or on control module 108, and communicate with cameras 102, lights 104, radar sensors 106, control module 108, actuator 110, and/or mobile device 120 via network 150 as described in further detail below.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, image logging platform 200 may be configured and/or programmed to operate with a vehicle having a Level-4 or Level-5 autonomous vehicle controller.

Cameras 102 may be standard cameras integrated with vehicle 101 that capture image data to facilitate vehicle operations such as backing up, parking, security, and/or monitoring drivers for distracted or sleepy behaviors. Accordingly, cameras 102 may be disposed along the exterior of vehicle 101, e.g., on the front, side panels, side view mirror, and/or rear of vehicle 101, to capture image data external to vehicle 101 and/or within the interior of vehicle 101, e.g., on the dash, rearview mirror, integrated with control module 108, etc., to capture image data of the interior space within vehicle 101. Further, additional cameras may be integrated with vehicle 101 to provide additional fields of view in and around vehicle 101. As will be understood by a person having ordinary skill in the art, less or more cameras 102 may be integrated with vehicle 101 than is depicted in FIG. 1.

Lights 104 may be standard lights integrated with vehicle 101 such as headlights or taillights for illuminating the vicinity of vehicle 101, and or additional lights such as side view mirror lights, brake lights, etc. Further, additional lights may be integrated with vehicle 101 to provide additional illumination around vehicle 101. As will be understood by a person having ordinary skill in the art, less or more lights 104 may be integrated with vehicle 101 than is depicted in FIG. 1. In addition, vehicle 101 may include light sensors for detecting the amount of light in the vicinity of vehicle 101, such that lights 104 may be automatically activated upon determination that the vicinity around vehicle 101 is too dark via the light sensors.

Radar sensors 106 may be standard sensors integrated with vehicle 101 for facilitating vehicle operations to detect a proximity of a body, e.g., person or object, in the vicinity of vehicle 101 to facilitate vehicle operations such as parking, automatic cruise control, or automatic braking of vehicle 101. Accordingly, radar sensors 106 may be disposed along the exterior of vehicle 101, e.g., on the front, side panels, side view mirror, and/or rear of vehicle 101. In some embodiments, radar sensors 106 may be other types of sensor, such as sensors that use ultrasound technology to detect the proximity of a body in the vicinity of vehicle 101. Moreover, other sensors integrated within the vehicle may be configured to detect handheld actuator 110 and/or mobile device 120 within the vicinity of vehicle 101 and/or directly or over a network, wirelessly communicate with handheld actuator 110 and/or mobile device 120. Further, additional radar sensors may be integrated with vehicle 101 to provide additional fields of view around vehicle 101. As will be understood by a person having ordinary skill in the art, less or more radars 106 (or other sensors) may be integrated with vehicle 101 than is depicted in FIG. 1.

Control module 108 of vehicle 101 may access the GPS system of vehicle 101 as well as information stored in an online database regarding, e.g., popular nearby locations based on the geographical location of vehicle 101, and suggest and/or direct vehicle 101 to the popular nearby location. For example, the popular nearby locations may be national monuments or scenic vantage points. Moreover, control module 108 may use data received from cameras 102, radar sensors 104, and/or other vehicle sensors to determine whether vehicle 101 is in a desirable position at the popular nearby location to capture the photo or video, e.g., whether the surrounding view is obstructed or whether the lighting is poor. In some embodiments, control module 108 may include a graphical user interface (GUI) which incorporates the functionality of actuator 110 and/or mobile device 120. Accordingly, the GUI of control module 108 may permit an occupant of vehicle 101 to initiate the taking of a photo or recording of a video, adjust image settings, and/or view photos/videos captures by cameras 102. Additionally, control module 108 may house image logging platform 200. Moreover, the GUI of control module 108 may permit the user to adjust preprogrammed settings of image logging platform 200, e.g., automatic feature as described in further detail below, whether to initiate the automatic image capture upon departure or arrival from vehicle 101, whether to directly transmit image data to paired mobile devices or via push notification or email, timers, which cameras to use, what style of photo/video to capture, etc.

Handheld actuator 110 may be, for example, a standard key fob that may be carried by an occupant of vehicle 101, e.g., the driver, with additional button(s) 112, e.g., a camera and/or video button. Button 112 may be actuated by a user to send a signal to a processor of vehicle 101, e.g., image logging platform 200, to initiate the taking of a photo and/or recording of a video by cameras 102 of vehicle 101. As shown in FIG. 1, actuator 110 may include a single button 112. Thus, button 112 may be actuated in various manners to initiate, e.g., the taking of a photo or the start and stop of the recording of a video. For example, button 112 may be pressed once to take a photo, twice to start the recording of a video, and once or twice following the start of a video to stop the video recording. As will be understood by a person having ordinary skill in the art, button 112 may be preprogrammed to initiate the taking of a photo and/or the recording of a video using other actuation patterns. Alternatively, actuator 110 may include a separate camera button and a separate video button. Accordingly, the camera button may be pressed once to take a photo, and the video button may be pressed once to start the recording of a video and once more to stop the recording of the video. Moreover, button 112 may be actuated in a predetermined manner to send a signal to vehicle 101 to cause lights 104 to create a flash that is timed with the taking of a photo or to illuminate the vicinity of vehicle 101 that is timed with the recording of a video. Alternatively, actuator 110 may include a separate button, e.g., a flash button, to send a signal to vehicle 101 to cause lights 104 flash/illuminate.

Mobile device 120 may have an application installed thereon for interfacing with image logging platform 200. For example, the application may permit mobile device 120 to receive image data from image logging platform 200, e.g., video data or picture data, captured by cameras 102. Mobile device 120 may receive and store the image data, e.g., when mobile device is within a predetermined range of vehicle 101. If mobile device 120 is in the process of downloading an image data file, and goes out of the predetermined range, downloading of the image data file may be temporarily paused until mobile device 120 is within the predetermined range of vehicle 101. Mobile device 120 may receive the image data automatically when mobile device 120 is within a predetermined range of vehicle 101, or upon acceptance of a push notification sent to mobile device 120 by vehicle 101. Additionally or alternatively, a user may actively download the image data files from image logging platform 200 via the application installed on mobile device 120 or via an email sent to an email account accessible by mobile device 120 or another computing device. Mobile device 120 may be, for example, a smartphone, a tablet, or a smartwatch. In one embodiment, handheld actuator 110 may be integrated with mobile device 120. Accordingly, the application may display graphical representations of one or more buttons that may be actuated to send signals to vehicle 101 to initiate the taking of a photo, recording of a video, or providing illumination as described above.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication.

Information shared between image logging platform 200, cameras 102, lights 104, radar sensors 106, control module 108, handheld actuator 110, and/or mobile device 120, may be stored on cloud storage 160 and may be bi-directional in nature. For example, in one case, image logging platform information may be transferred from image logging platform 200 to cloud storage 160. Such information stored on cloud storage 160 may be accessed and downloaded by mobile device 120, or other devices, e.g., a remote computing device.

Figure 2:
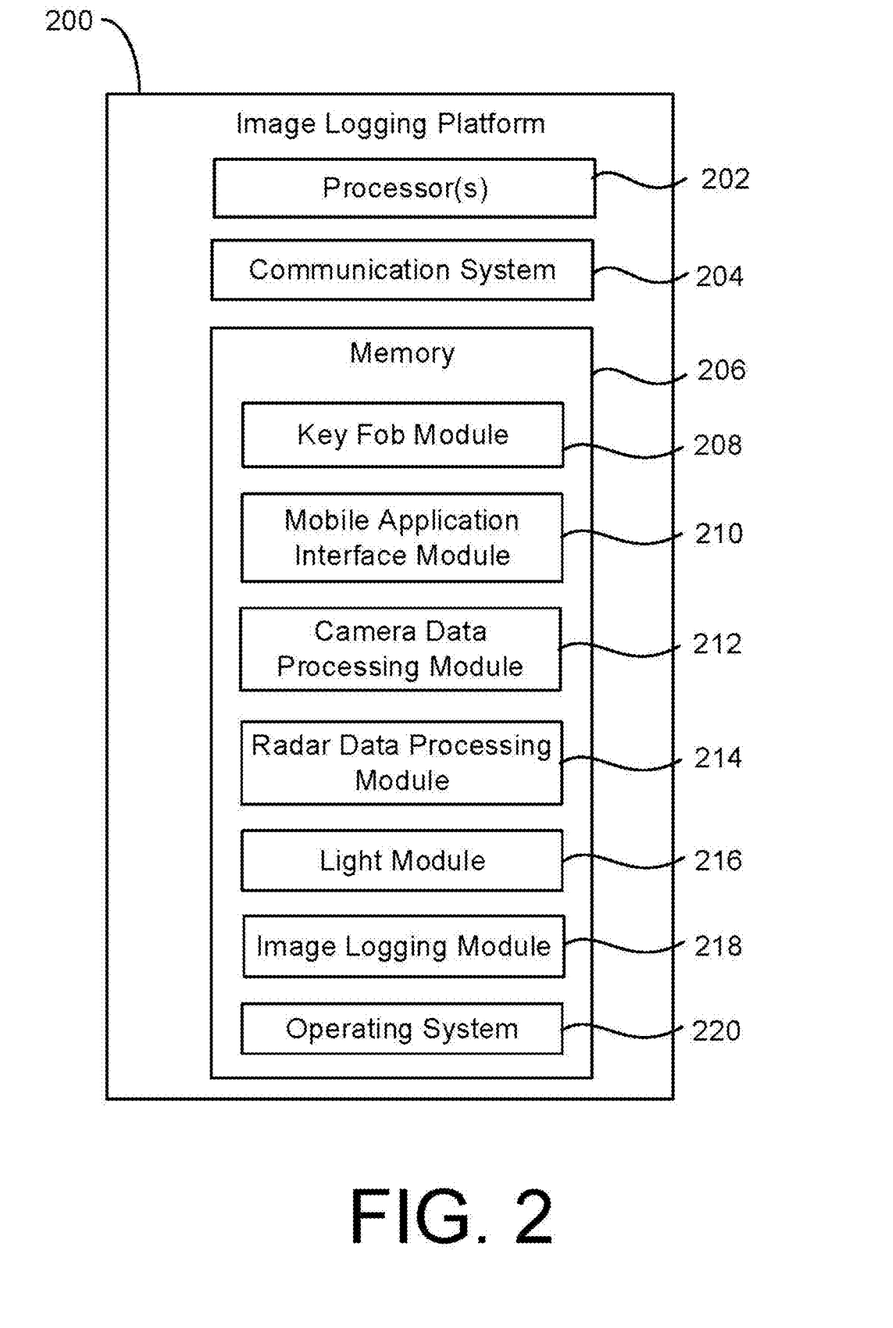
FIG. 2 shows some example components that may be included in an image logging platform in accordance with the principles of the present disclosure.

Referring now to FIG. 2, components that may be included in image logging platform 200 are described in further detail. Image logging platform 200 may include one or more processors 202, communication system 204, and memory 206. Communication system 204 may include a wireless transceiver that allows image logging platform 200 to communicate with cameras 102, lights 104, radar sensors 106, control module 108, actuator 110, and/or mobile device 120. The wireless transceiver may use any of various communication formats, such as, for example, an Internet communications format, or a cellular communications format.

Memory 206, which is one example of a non-transitory computer-readable medium, may be used to store operating system (OS) 220, key fob module 208, mobile application interface processing module 210, camera data processing module 212, radar data processing module 214, light module 216, and image logging module 218. The modules are provided in the form of computer-executable instructions that may be executed by processor 202 for performing various operations in accordance with the disclosure.

Key fob module 208 may be executed by processor 202 for receiving one or more signals from actuator 110, e.g., a key fob. For example, key fob module 208 may receive one or more signals from actuator 110 indicative of a command by the user to initiate either the taking of a photo or the start or stop of a recording of video. As described above, actuator 110 may be actuated in various manners, e.g., various actuation patterns or actuation of separate buttons, depending on whether the action to be taken. Moreover, key fob module 208 may receive one or more signals from actuator 110 indicative of desired settings, e.g., whether or not to cause lights 104 to illuminate the vicinity of vehicle 101 when a photo or video is captured by cameras 102. Accordingly, key fob module 208 may process the signal received from actuator 208 to determine which action to take.

Mobile application interface processing module 210 may be executed by processor 202 for interfacing with a mobile application installed on mobile device 120. For example, mobile application interface processing module 210 may determine if mobile device 120 is paired with image logging platform 200, e.g., via communication system 204, and further may transmit image data to mobile device 120 when paired. Moreover, mobile application interface processing module 210 may pause the transmission of image data to mobile device 120 when it is determined that mobile device 120 is outside a predetermined range from vehicle 101, and may cause the remaining image data to be stored, e.g., either on memory 206 or on a cloud server, until mobile device 120 is determined to be within the predetermined range. In some embodiments, mobile application interface processing module 210 may automatically transmit the image data to mobile device 120 when paired, or alternatively, mobile application interface processing module 210 may transmit a push notification to mobile device 120 to download the image data. Additionally or alternatively, mobile application interface processing module 210 may transmit the image data via, e.g., email, which may be accessed by mobile device 120 or another computing device. Moreover, when actuator 110 is integrated with mobile device 120 as described above, mobile application interface processing module 210 may interface with mobile device 120 to receive the one or more signals from mobile device 120 indicative of a command by the user to initiate either the taking of a photo or the start or stop of a recording of video, or to adjust settings.

Camera data processing module 212 may be executed by processor 202 for causing cameras 102 to take a photo and/or start and stop the recording of a video responsive to the command signal received and processed by key fob module 208. In some embodiments, camera data processing module 212 may cause specific cameras of cameras 102 to take the photo or record video based on data received from radar sensors indicative of the position of a person, e.g., based on the position of actuator 110 relative to vehicle 101. For example, if a user carrying actuator 110 is detected in the vicinity of the front vehicle 101 by radar sensors 106, camera data processing module 212 may cause cameras 102 positioned on vehicle 101 which have a field of view of the front of vehicle 101 to take the photo or record the video. In addition, camera data processing module 212 may cause specific cameras of cameras 102 to take a photo based on the camera settings selected via actuator 110, e.g., a panoramic photo or stop motion photo. Moreover, camera data processing module 212 may receive and process image data received from cameras 102. For example, camera data processing module 212 may compress the image data so that it may be easily transmitted via communication system 204 to mobile device 120.

Radar data processing module 214 may be executed by processor 202 for causing radar sensors 106 to detect the proximity of a person or object in the vicinity of vehicle 101, and for receiving data from radar sensors 106 indicative of the proximity of the person or object in the vicinity of vehicle 101. Moreover, radar data processing module 214 may determine the relative location of actuator 110 to vehicle 101 based on data received from radar sensors 106, e.g., when a person carrying actuator 110 walks toward the front of vehicle 101. Accordingly, when key fob module 208 receives a command to take a photo or record video, radar data processing module 214 may transmit data indicative of the location of actuator 110 received from radar sensors 106 to camera data processing module 212 such that camera data processing module 212 may instruct only the cameras of cameras 102 that have a field of view of where actuator 110 is located relative to vehicle 101 to take the photo or record video. Moreover, in an automatic settings mode, radar data processing module 214 may transmit data indicative of the location of actuator 110 received from radar sensors 106 to camera data processing module 212 such that camera data processing module 212 may instruct the cameras of cameras 102 that have a field of view of where actuator 110 is located relative to vehicle 101 to take the photo or record video automatically.

Light module 216 may be executed by processor 202 for causing lights 104 to illuminate the vicinity of vehicle 101. In addition, light module 216 may cause specific lights of lights 104 of vehicle 101 to illuminate in a predetermined manner to indicate a certain action is being taken. For example, light module 216 may cause lights 104 to flash once to indicate that a photo was taken or twice to indicate that a video has begun recording, and twice again to indicated that the video recording has stopped. As will be understood by a person having ordinary skill in the art, different predetermined manners of illumination by lights 104 may be preprogrammed to indicate different actions being taken. The lights of lights 104 used to illuminate a photo, e.g., create a flash like effect, or video may be different from the lights of lights 104 used to indicate an action has been taken. For example, the headlights of vehicle 101 may be used to create the flash effect, whereas brake lights or lights on the side view mirror of vehicle 101 may be used to indicate that the photo was taken. Additionally or alternatively, the horn of vehicle 101 may be used to indicate an action has been taken. Accordingly, control module 108 may cause the horn of vehicle 101 to honk in a predetermined manner to indicate a certain action is being taken.

Image logging module 218 may be executed by processor 202 for storing image data received from camera data processing module 212, e.g., in memory 206 or on a cloud server, and for instructing mobile application interface module 210 to transmit the image data to mobile device 120.

Figure 3:
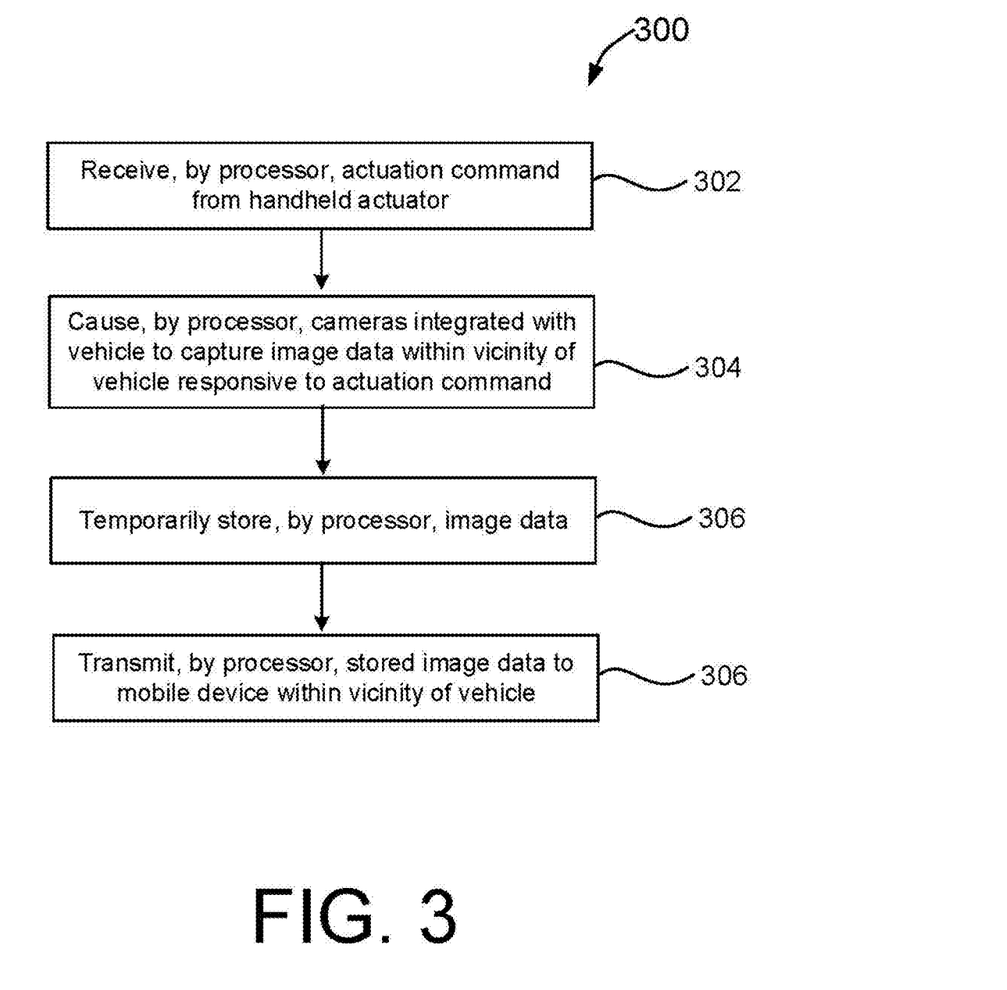
FIG. 3 is a flow chart illustrating exemplary steps for logging images using a vehicle in accordance with the principles of the present disclosure.

Referring now to FIG. 3, exemplary method 300 for logging images using vehicle 101 is described. At step 302, an actuation command may be received by, e.g., key fob module 208, from handheld actuator 110. At step 304, camera data processing module 212 may cause cameras 102 to capture image data within a vicinity of the vehicle responsive to the actuation command. For example, camera data processing module 212 may cause cameras 102 to take a photo or start or stop the recording of video. At step 306, image logging module 218 may store, at least temporary, the image data received by camera data processing module 212 in, e.g., memory 206 or on a cloud server. At step 308, mobile application interface module 210 may transmit the stored image data to mobile device 120, e.g., when mobile device 120 is within a predetermined range of vehicle 101.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for logging images, the system comprising:
a handheld actuator;
a memory that stores computer-executable instructions; and
a processor configured to access the memory and execute the computer-executable instructions to:
cause one or more sensors integrated with a vehicle to detect a position of the handheld actuator relative to the vehicle;
select one or more cameras of a plurality of cameras integrated with the vehicle based on the detected position of the handheld actuator, the selected one or more cameras having a field of view of the detected position of the handheld actuator;
cause the selected one or more cameras to capture image data within a vicinity of the vehicle upon actuation by the handheld actuator;
at least temporarily store the image data until a mobile device is within a predetermined range of the vehicle; and
transmit the image data to the mobile device when the mobile device is within the predetermined range of the vehicle, wherein the mobile device is configured to download the image data when the mobile device is within the predetermined range of the vehicle, and wherein the image download is temporarily paused when the mobile device moves out of the predetermined range of the vehicle.

2. The system of claim 1, wherein the handheld actuator is integrated with a key fob.

3. The system of claim 1, wherein the handheld actuator is integrated with the mobile device.

4. The system of claim 1, wherein the image data comprises video data or picture data.

5. The system of claim 4, wherein the handheld actuator is configured to be actuated in a first manner to cause the processor to cause the one or more cameras to capture video data, and wherein the handheld actuator is configured to be actuated in a second manner different from the first manner to cause the processor to cause the one or more cameras to capture picture data.

6. The system of claim 1, wherein the processor is configured to cause the one or more cameras to capture image data during a vehicle operation, and to cause a display integrated with the vehicle to display the image data in real-time to facilitate the vehicle operation.

7. The system of claim 1, wherein the mobile device comprises at least one of a smartphone, a tablet, or a smartwatch.

8. The system of claim 1, wherein the processor is configured to cause one or more sensors integrated with the vehicle to detect a proximity of a body in a vicinity of the vehicle and to generate data indicative of the detected proximity of the body.

9. The system of claim 8, wherein the processor is configured to cause one or more sensors to detect the handheld actuator within a predetermined range of the one or more cameras.

10. The system of claim 9, wherein the processor is configured to automatically cause the one or more cameras to capture image data upon detection of the handheld actuator within the predetermined range of the one or more cameras.

11. The system of claim 8, the processor is configured to cause the one or more sensors to detect the proximity of the body within the vicinity of the vehicle during a vehicle operation, and wherein the data indicative of the detected proximity of the body is configured to facilitate the vehicle operation.

12. The system of claim 11, wherein the vehicle operation comprises at least one of parking of the vehicle, automatic cruise control of the vehicle, or automatic braking of the vehicle.

13. The system of claim 1, wherein the processor is configured to cause one or more lights integrated with the vehicle to illuminate a vicinity of the vehicle simultaneously when the processor causes the one or more cameras to capture the image data.

14. The system of claim 13, wherein the handheld actuator comprises a light actuator, and wherein the processor is configured to cause the one or more lights to illuminate the vicinity of the vehicle upon actuation of the light actuator of the handheld actuator.

15. The system of claim 13, wherein the one or more lights are at least one of headlights or taillights of the vehicle.

16. The system of claim 1, wherein the processor is configured to compress the captured image data prior to transmitting the image data to the mobile device.

17. A method for logging images, the method comprising:
receiving, by a processor, an actuation command from a handheld actuator;
causing, by the processor, one or more sensors integrated with a vehicle to detect a position of the handheld actuator relative to the vehicle;
selecting, by the processor, one or more cameras of a plurality of cameras integrated with the vehicle based on the detected position of the handheld actuator, the selected one or more cameras having a field of view of the detected position of the handheld actuator;
causing, by the processor, the selected one or more cameras to capture image data within a vicinity of the vehicle responsive to the actuation command;
at least temporarily storing, by the processor, the image data captured via the selected one or more cameras until a mobile device is within a predetermined range of the vehicle;
transmitting, by the processor, the stored image data to the mobile device when the mobile device is within the predetermined range of the vehicle, wherein the mobile device is configured to download the image data when the mobile device is within the predetermined range of the vehicle, and wherein the image download is temporarily paused when the mobile device moves out of the predetermined range of the vehicle.

18. The method of claim 17, further comprising:
causing, by the processor, one or more lights integrated with the vehicle to illuminate a vicinity of the vehicle simultaneously when the processor causes the one or more cameras to capture the image data.

19. The method of claim 17, further comprising:
causing, by the processor, one or more sensors integrated with the vehicle to detect the handheld actuator within a predetermined range of the one or more cameras; and
automatically causing, by the processor, the one or more cameras to capture image data upon detection of the handheld actuator within the predetermined range of the one or more cameras.

* * * * *